H. FROST.
FREIGHT ESCALATOR.
APPLICATION FILED MAR. 24, 1917.
1,433,884.
Patented Oct. 31, 1922.
3 SHEETS—SHEET 3.
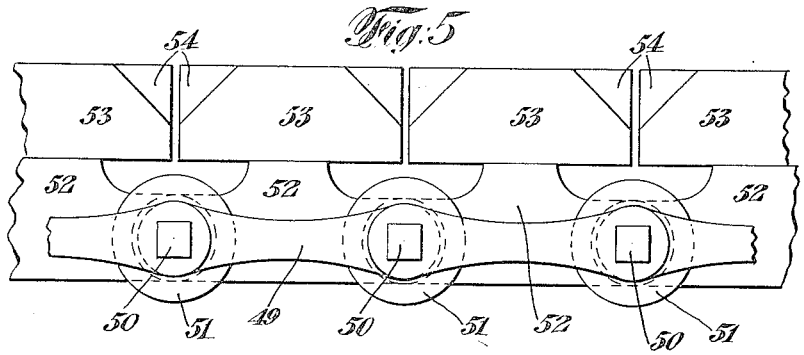
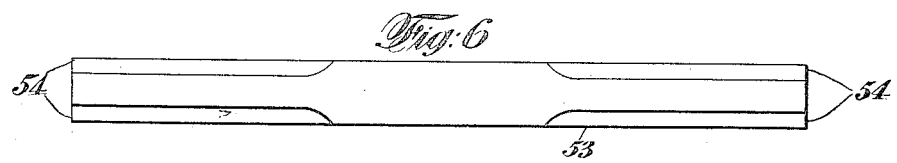
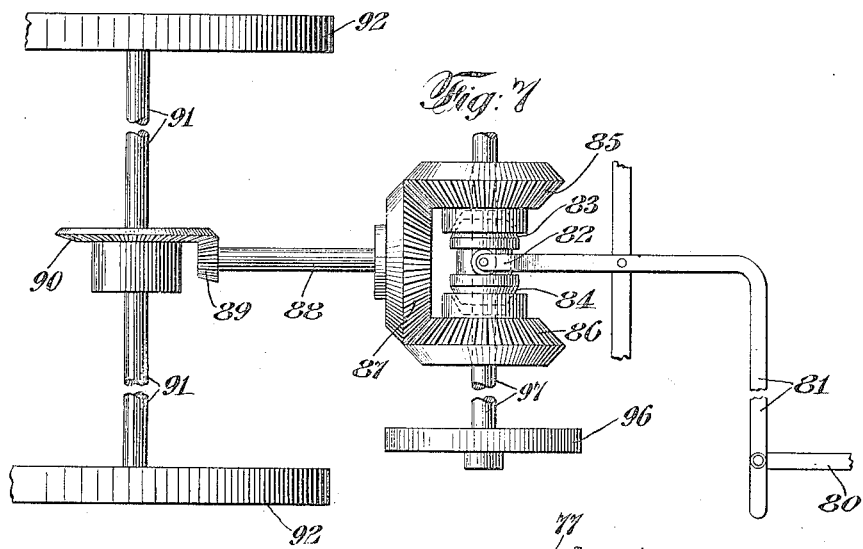
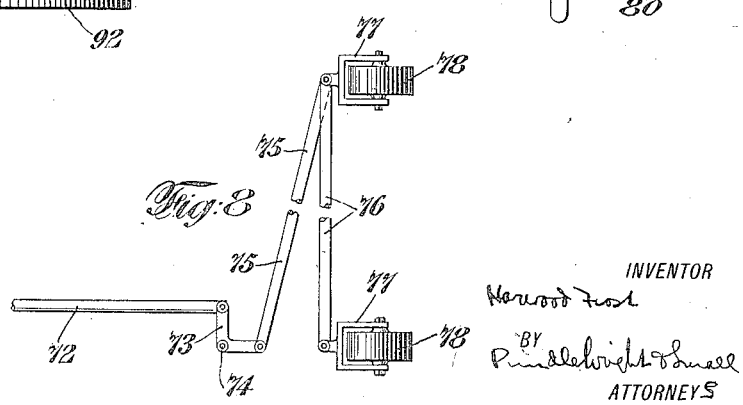
INVENTOR
Harwood Frost
BY
Prindle, Wright & Small
ATTORNEYS Patented Oct. 31, 1922.

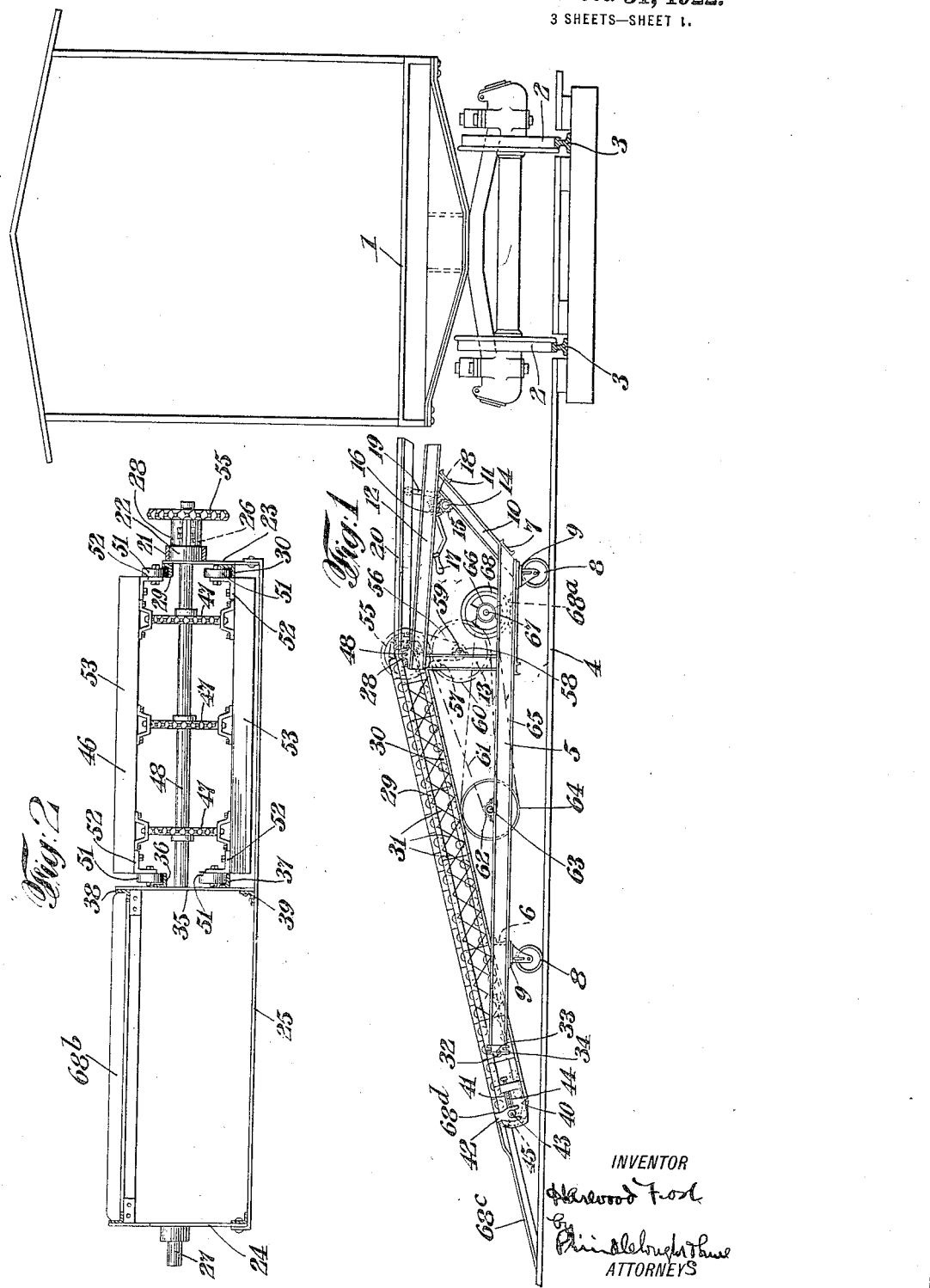

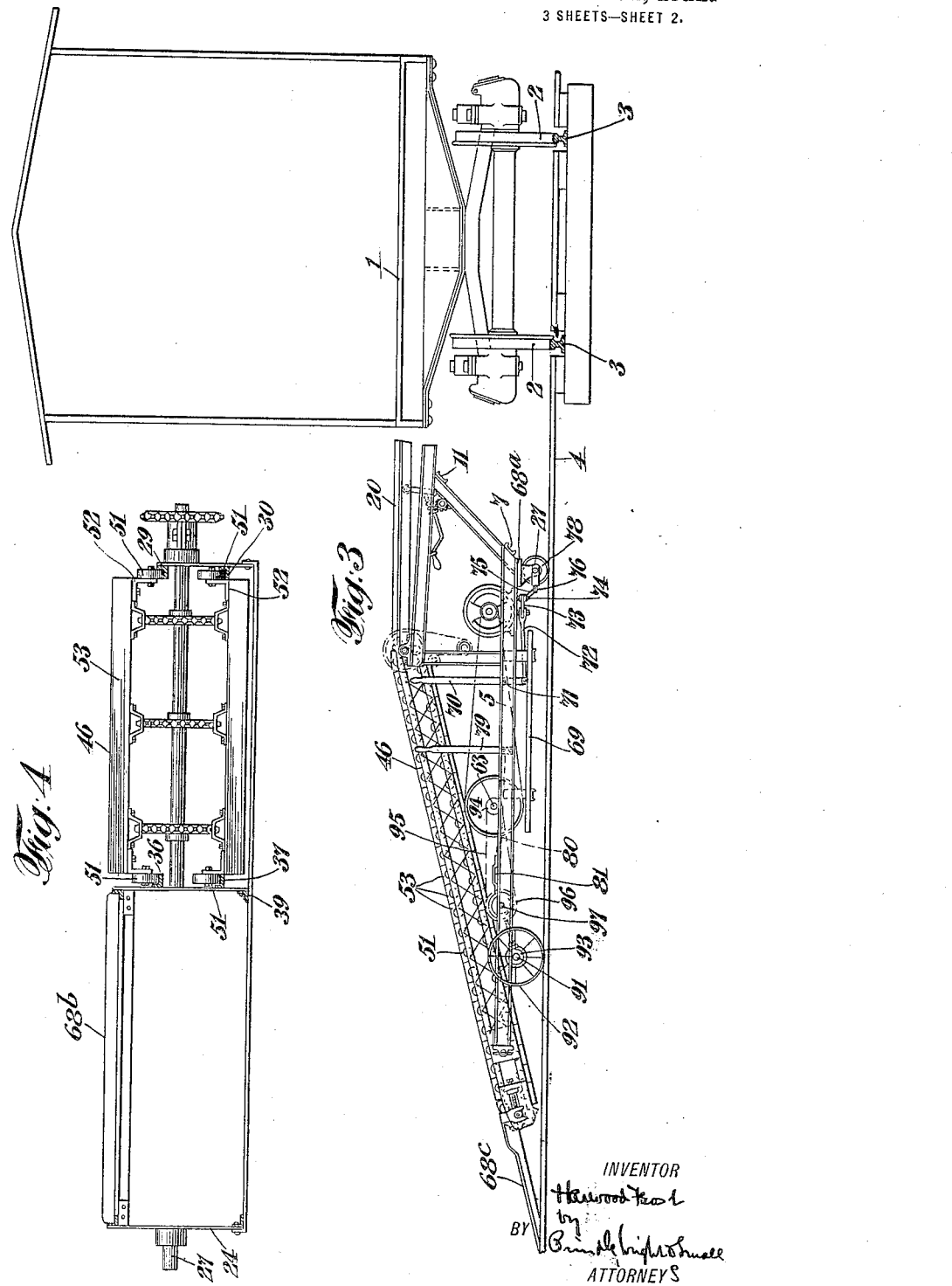

1,433,884

UNITED STATES PATENT OFFICE.

HARWOOD FROST, OF CHICAGO, ILLINOIS.

FREIGHT ESCALATOR.

Application filed March 24, 1917. Serial No. 157,078.

*To all whom it may concern:*

Be it known that I, HARWOOD FROST, of Chicago, in the county of Cook and in the State of Illinois, have invented a certain new and useful Improvement in Freight Escalators, and do hereby declare that the following is a full, clear, and exact description thereof.

My invention relates particularly to apparatus designed for loading freight, but it relates especially to means for loading freight by conveying the same from a lower to a higher level, while the freight is carried by a truck or other vehicle.

An object of my invention is to provide an apparatus by means of which trucks or other vehicles containing freight may be bodily moved from a lower to a higher elevation, so that the freight may be unloaded from the truck or other vehicle at said higher elevation, as for example when it is desired to load freight into a car from a platform located at a lower level.

A further object of my invention is to provide a construction of this character by means of which the truck or other vehicle may be conveniently lowered from the elevated position to the lower level after the freight has been discharged from the same.

A further object is to provide an apparatus of the above character which may be used for loading freight, when not carried by a truck.

A further object of my invention is to provide a combined escalator and ramp for the purposes as above described.

Further objects of my invention will appear from a detailed description thereof contained hereinafter.

While my invention is capable of embodiment in many different forms, for the purpose of illustration I have shown only certain forms thereof in the accompanying drawings, in which—

Figure 1 is a side elevation of an apparatus made in accordance with my invention showing the same in the position in which it is being used for loading a freight car;

Fig. 2 is a transverse section through a portion of the same;

Fig. 3 is a side elevation of a modified form of my invention;

Fig. 4 is a transverse section through a portion of the same;

Fig. 5 is a side elevation of a portion of the escalator belt;

Fig. 6 is a plan view of one of the cross bars supported by the escalator;

Fig. 7 is a plan view showing the arrangement of the clutch for the form of my invention shown in Fig. 3; and Fig. 8 is a plan view showing the arrangement of the steering mechanism for the form of my invention shown in Fig. 3.

In the form of my invention shown in Fig. 1, I have indicated a freight car 1 having wheels 2 running on tracks 3 adjacent to a platform 4. On the platform 4 there is located a movable carriage comprised of side channel bars 5 connected by transverse channel bars 6 and 7, the same being supported upon four wheels 8 carried by ball bearing pivots 9. At the forward end of the carriage there are provided two upwardly inclined side channel bars 10 connected at their upper ends by cross channel bars 11. At the upper ends of the channel bars 10 there are two horizontal channel bars 12 connected at their rear ends to two vertical channel bars 13 at the side of the carriage, supported from the side channel bars 5. Upon the inclined channel bars 10 there is a shaft 14 having a worm wheel 15 adapted to cooperate with a worm 16 operated by a hand crank 17. On the shaft 14 there is furthermore located a lever 18, which is connected by a link 19 to a movable platform 20 pivoted at its rear end by means of straps 21 passing over cylindrical extensions 22 on side plates 23 and 24. The side plates 23 and 24 are connected together by transverse straps 25 passing under the same, thus forming a unitary structure which is supported by means of cylindrical extensions 26 and 27 in blocks 28 located on the channel bars 12. The plates 23 and 24 are connected to upper and lower angle rods 29 and 30 which are connected together by cross bars 31, said angle bars 29 being connected at their lower ends to lower side plates 32 having cylindrical extensions 33 supported in blocks 34 at the rear ends of the channel bars 5. Between the side plates 23 and 24 there is an intermediate member 35 which carries upper and lower angle bars 36 and 37 at one side and upper and lower angle bars 38 and 39 at the other side thereof. At their lower ends the angle bars 29, 30, 36 and 37 carry end plates 40 having slots 41 to receive sliding carriages 42 for a shaft 43 adapted to be adjusted by screws 44 located in the end plates 40. The shaft 43 carries three sprocket wheels 45 over which runs a link belt 46, the upper end of which passes over a series of three sprocket wheels 47 carried by a shaft 48 supported in the side plate 23 and the intermediate member 35. The link belt 46 is comprised of a plurality of longitudinally extending links 49 which connect together a plurality of axles 50 carrying rollers 51 arranged to run on the angle bars 29, 30, 36 and 37 and arranged to receive carriages 52 which carry cross bars 53 to form a platform for supporting the vehicle from which the freight is to be loaded into the car 1. Near their ends the cross bars 53 are provided with beveled edges 54 to form convenient supports for holding the wheels of a truck or vehicle carrying the freight while being elevated. On the end of the shaft 48 there is a sprocket wheel 55 which is driven by a link chain 56 kept tight by an idler 57 and passing over a sprocket 58 on a shaft 59 supported in bearings upon the bars 13. On the shaft 59 there is a pulley 60 connected by a belt 61 with a pulley 62 on a shaft 63, having a pulley 64, which in turn is connected by a belt 65 to a pulley 66 on a shaft 67 of an electric motor 68 which is supported in any suitable manner on a plate 68$^a$ from the channel bars 5. Between the intermediate member 35 and the side plate 24 there is an inclined way or ramp 68$^b$ for the descent of the truck or vehicle carrying the freight. At the bottom of the ramp 68$^b$ and the link belt 46 there is a pivoted plate 68$^c$ which is carried by two yokes 68$^d$ upon the two ends of the shaft 43, so as to guide the truck or vehicle onto and away from the apparatus.

The modification of my invention shown in Fig. 3 is constructed the same as the modification above described, except means is provided for driving the same by power and for steering the same by means of an operator carried by the apparatus. The differences in this modification of my invention comprise a side platform 69 which is adjacent to a steering handle 70 carried by a stub shaft 71 on one of the channel bars 5 and conected at its lower end to a link 72 which in turn is connected to a bell-crank lever 73 carried by the pivot 74 on the supporting plate 68$^a$. The bell-crank lever 73 is in turn connected by a link 75 to a cross rod 76 which is connected by yokes 77 to two front supporting wheeels 78. Adjacent to the platform 69 there is also a lever 79 for controlling the power driving mechanism of the apparatus, the same being connected by a link 80 to a lever 81 having a yoke 82 at its end to control the forward or rearward movement of the vehicle by changing the position of cones 83 and 84 with regard to bevel gears 85 and 86 arranged to cooperate with a bevel gear 87 on a shaft 88 leading to a bevel gear 89 and arranged to drive a differential 90 on a rear axle 91 carrying wheels 92. The axle 91 is supported in bearings 93 on the side channel bars 5. Upon the shaft 63 there is furthermore provided a pulley 94 connected by a belt 95 to a pulley 96 located on a shaft 97 which is the shaft carrying the bevel gears 85 and 86 and the cones 83 and 84.

In the operation of the form of my invention shown in Fig. 1 the apparatus is moved by hand adjacent to the door opening of the freight car 1 and the movable platform 20 is then adjusted by means of the hand crank 17 until its forward end has the same level as the floor of the car 1. Thereupon after power has been applied to the motor 68 so as to move the belt 46 a truck or vehicle carrying freight may be steered onto the plate 68$^c$ and therefrom onto the belt 46 which will then convey the truck or vehicle upwardly to the platform 20 so that the freight may be loaded therefrom into the car 1. After the freight has been unloaded from the truck or vehicle the same may descend by the inclined way or ramp 68$^b$ and thence by means of the inclined plate 68$^c$ to the platform 4.

The modification of my invention shown in Fig. 3 operates in the same manner as the modification already described, except that in this form of my invention by operating the handles 79 and 70 the vehicle may be moved by means of power obtained from the motor 68 so as to move the apparatus to the point adjacent to the car 1 whence the freight is to be loaded into the same. By moving the handle 79 the movement of the apparatus forwardly and rearwardly may be controlled, and by moving the handle 70 the direction of movement of the apparatus may be controlled.

While I have described my invention above in detail, I wish it to be understood that many changes may be made therein without departing from the spirit of my invention.

I claim:

1. An escalator comprising a frame carried by rollers to permit the same to be moved from place to place, an elevated platform mounted upon said frame, means adjustably supporting the outer end of said platform upon the frame, said platform being of such dimensions as to receive and hold the goods to be transported and an inclined conveyer mechanism leading from the bottom of said frame to said platform.

2. In an escalator, an elongated frame, an inclined conveyer mechanism supported thereby, a platform mounted upon said frame and located adjacent the upper end of the conveyer mechanism, means adjustably supporting the outer end of said platform upon the frame, said platform and conveyer being each of such dimensions as to permit a vehicle to be received thereupon.

3. In an escalator, an elongated frame, an inclined conveyor mechanism supported thereby, a platform supported in fixed position by said frame and located adjacent the upper end of the conveyor mechanism, and means adjustably connecting the outer end of the platform and the frame for adjusting the elevation of the outer end of said platform.

4. In an escalator, an elongated frame, an inclined conveyor mechanism supported thereby, a platform supported in fixed position by said frame and located adjacent the upper end of the conveyor mechanism, said platform being of such dimensions as to permit a vehicle to be received thereupon, and means adjustably connecting the outer end of the platform and the frame for adjusting the elevation of the outer end of said platform.

5. In an escalator, an elongated frame, an inclined conveyor mechanism supported thereby, a platform mounted upon said frame and located adjacent the upper end of the conveyer mechanism, means adjustably supporting the outer end of said platform upon the frame, said platform being of such dimensions as to receive and hold the goods to be transported.

6. In an escalator, a supporting frame mounted upon wheels, an inclined conveyor belt supported thereby, a platform mounted upon said frame and located adjacent the upper end of the conveyor mechanism, means adjustably supporting the outer end of said platform upon the frame an inclined way supported by said frame parallel to said conveyor belt and extending from said platform to the bottom level of said escalator, said belt, platform and way being of such dimensions as to permit a truck to be moved upon and off from said platform.

7. In an escalator an elongated frame, an inclined conveyor mechanism supported thereby, a platform pivotolly mounted upon the frame adjacent the conveyor mechanism, a ramp way leading from the platform and adjacent the conveyor mechanism and a plate attached to the end of the conveyor mechanism and the ramp, remote from the platform.

In testimony that I claim the foregoing I have hereunto set my hand.

HARWOOD FROST.

Witnesses:
G. W. CLARK,
JOHN F. LEONARD.